United States Patent
Jones-McFadden et al.

(10) Patent No.: US 10,621,558 B2
(45) Date of Patent: Apr. 14, 2020

(54) SYSTEM FOR AUTOMATICALLY ESTABLISHING AN OPERATIVE COMMUNICATION CHANNEL TO TRANSMIT INSTRUCTIONS FOR CANCELING DUPLICATE INTERACTIONS WITH THIRD PARTY SYSTEMS

(71) Applicant: BANK OF AMERICA CORPORATION, Charlotte, NC (US)

(72) Inventors: Alicia C. Jones-McFadden, Fort Mill, SC (US); Matthew Hsieh, Charlotte, NC (US); Scott R. Enscoe, Charlotte, NC (US); Elizabeth Ann Miller, Brooklyn, NY (US); Alicia Anli Salvino, Rockville, MD (US); Daniel Shilov, Nashua, NH (US); Michael Anderson, Colleyville, TX (US); Raghav Anand, Chadds Ford, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 478 days.

(21) Appl. No.: 15/288,833

(22) Filed: Oct. 7, 2016

(65) Prior Publication Data
US 2018/0103112 A1  Apr. 12, 2018

(51) Int. Cl.
*G06Q 20/00* (2012.01)
*G06Q 20/40* (2012.01)

(52) U.S. Cl.
CPC .......... *G06Q 20/00* (2013.01); *G06Q 20/405* (2013.01)

(58) Field of Classification Search
CPC .................................................. H04L 67/306
(Continued)

(56) References Cited

U.S. PATENT DOCUMENTS

| 5,864,684 A | 1/1999 | Nielson |
| 5,918,217 A | 6/1999 | Maggioncalda et al. |

(Continued)

FOREIGN PATENT DOCUMENTS

| CA | 2626172 A1 | 11/2009 |
| CA | 2629653 A1 | 11/2009 |

(Continued)

OTHER PUBLICATIONS

Egele, Manuel, et al., "COMPA: Detecting Compromised Accounts on Social Networks", NDSS 2013, San Diego, CA, Feb. 24-27, 3013, 17 pages.

(Continued)

*Primary Examiner* — Sm A Rahman
*Assistant Examiner* — Emad Siddiqi
(74) *Attorney, Agent, or Firm* — Michael A. Springs; Moore & Van Allen PLLC; Nicholas C. Russell

(57) ABSTRACT

Embodiments of the invention are directed to a system, method, or computer program product for identifying duplicate third party interactions based on information extracted from multiple resources associated with an enrolled user. Furthermore, the system may automatically modify a duplicate third party interaction upon identification, wherein the system may cancel the duplicate third party interaction by interrupting payments to the third party provider associated with the duplicate interaction. This allows for duplicate interactions to be canceled on behalf of the user without the system knowing user login information associated with the third party interaction. Additionally, the system may provide options for modifying duplicate interactions to the user by way of actionable notifications on the user's computing device via a client application. The system may also provide the user with reasons for why similarly-situated users modi- (Continued)

fied third party interactions to aid the user's decision making process.

20 Claims, 9 Drawing Sheets

(58) Field of Classification Search
USPC .......................................................... 709/224
See application file for complete search history.

(56) References Cited

U.S. PATENT DOCUMENTS

| | | | |
|---|---|---|---|
| 6,012,044 A | 1/2000 | Maggioncalda et al. |
| 6,278,993 B1 | 8/2001 | Kumar et al. |
| 6,327,578 B1 | 12/2001 | Linehan |
| 6,629,081 B1 | 9/2003 | Cornelius et al. |
| 6,633,910 B1 | 10/2003 | Rajan et al. |
| 6,782,374 B2 | 8/2004 | Nichols |
| 6,829,334 B1 | 12/2004 | Zirngibl et al. |
| 6,892,192 B1 | 5/2005 | Geddes et al. |
| 7,085,834 B2 | 8/2006 | Delany et al. |
| 7,092,992 B1 | 8/2006 | Yu |
| 7,103,556 B2 | 9/2006 | Del Rey et al. |
| 7,165,041 B1 | 1/2007 | Guheen et al. |
| 7,296,734 B2 | 11/2007 | Pliha |
| 7,363,339 B2 | 4/2008 | Delany et al. |
| 7,364,071 B2 | 4/2008 | Esplin et al. |
| 7,406,537 B2 | 7/2008 | Cullen |
| 7,412,534 B2 | 8/2008 | Tsang et al. |
| 7,444,304 B2 | 10/2008 | Mellinger et al. |
| 7,486,780 B2 | 2/2009 | Zirngibl et al. |
| 7,624,073 B1 | 11/2009 | Robinson et al. |
| 7,672,879 B1 | 3/2010 | Kumar et al. |
| 7,698,190 B2 | 4/2010 | Penkalski et al. |
| 7,774,257 B2 | 8/2010 | Maggioncalda et al. |
| 7,788,147 B2 | 8/2010 | Haggerty et al. |
| 7,797,267 B2 | 9/2010 | Horvitz |
| 7,813,989 B2 | 10/2010 | Jones et al. |
| 7,860,774 B1 | 12/2010 | Peterson et al. |
| 7,912,770 B2 | 3/2011 | Haggerty et al. |
| 8,060,423 B1 | 11/2011 | Rukonic et al. |
| 8,073,759 B1 | 12/2011 | Del Favero et al. |
| 8,122,123 B2 | 2/2012 | Bhattacharya et al. |
| 8,135,655 B2 | 3/2012 | Oaten et al. |
| 8,260,699 B2 | 9/2012 | Smith et al. |
| 8,306,894 B2 | 11/2012 | Newman et al. |
| 8,346,568 B1 | 1/2013 | Del Favero et al. |
| 8,396,791 B2 | 3/2013 | Cotton |
| 8,407,137 B2 | 3/2013 | Thomas |
| 8,429,038 B1 | 4/2013 | Harman et al. |
| 8,458,051 B1 | 6/2013 | Saltzman et al. |
| 8,473,380 B2 | 6/2013 | Thomas et al. |
| 8,494,936 B2 | 7/2013 | Brenner |
| 8,515,828 B1 | 8/2013 | Wolf et al. |
| 8,548,929 B1 | 10/2013 | Goodwin et al. |
| 8,594,283 B2 | 11/2013 | Hogan et al. |
| 8,639,567 B2 | 1/2014 | Winters |
| 8,639,638 B2 | 1/2014 | Shae et al. |
| 8,682,793 B2 | 3/2014 | Carlson et al. |
| 8,688,699 B2 | 4/2014 | Eggink et al. |
| 8,713,090 B2 | 4/2014 | Sadovsky et al. |
| 8,719,132 B1 | 5/2014 | Diggdon et al. |
| 8,732,073 B2 | 5/2014 | Thomas |
| 8,768,736 B1 | 7/2014 | Chapman et al. |
| 8,768,800 B2 | 7/2014 | Milosavljevic et al. |
| 8,768,833 B2 | 7/2014 | Freishtat et al. |
| 8,788,661 B2 | 7/2014 | Raleigh |
| 8,825,759 B1 | 9/2014 | Jackson et al. |
| 8,930,217 B2 | 1/2015 | Feinschreiber et al. |
| 8,935,342 B2 | 1/2015 | Patel |
| 9,098,387 B1 | 8/2015 | Curtis et al. |
| 9,256,876 B2 | 2/2016 | Vasant Akole et al. |
| 9,286,637 B1 | 3/2016 | Keld et al. |
| 9,411,942 B2 | 8/2016 | Commons et al. |
| 9,460,443 B1 | 10/2016 | Curtis et al. |
| 2002/0174185 A1 | 11/2002 | Rawat et al. |
| 2002/0180786 A1 | 12/2002 | Tanner |
| 2003/0120593 A1 | 6/2003 | Bansal et al. |
| 2003/0139986 A1 | 7/2003 | Roberts, Jr. |
| 2003/0206554 A1 | 11/2003 | Dillon |
| 2004/0107125 A1 | 6/2004 | Guheen et al. |
| 2004/0138959 A1 | 7/2004 | Hlavac et al. |
| 2004/0153413 A1 | 8/2004 | Gross |
| 2004/0162773 A1 | 8/2004 | Del Rey et al. |
| 2004/0175680 A1 | 9/2004 | Hlavac et al. |
| 2004/0181591 A1 | 9/2004 | Yu et al. |
| 2004/0189702 A1 | 9/2004 | Hlavac et al. |
| 2005/0187862 A1 | 8/2005 | Dheer et al. |
| 2006/0014535 A1 | 1/2006 | Walker et al. |
| 2006/0224046 A1 | 10/2006 | Ramadas et al. |
| 2006/0265201 A1 | 11/2006 | Martin |
| 2006/0288023 A1 | 12/2006 | Szabo |
| 2007/0021200 A1 | 1/2007 | Fox et al. |
| 2007/0112906 A1 | 5/2007 | Liu et al. |
| 2007/0167689 A1 | 7/2007 | Ramadas et al. |
| 2007/0174448 A1 | 7/2007 | Ahuja et al. |
| 2007/0286099 A1 | 12/2007 | Stocklein et al. |
| 2008/0014908 A1 | 1/2008 | Vasant |
| 2008/0034045 A1 | 2/2008 | Bardsley |
| 2008/0086409 A1 | 4/2008 | Moorman et al. |
| 2008/0114677 A1 | 5/2008 | Keohane et al. |
| 2008/0133734 A1 | 6/2008 | Jacobs et al. |
| 2009/0024984 A1* | 1/2009 | Maeda .................... G06F 21/10 717/121 |
| 2009/0106171 A1 | 4/2009 | Hlavac et al. |
| 2009/0124349 A1 | 5/2009 | Dawson et al. |
| 2009/0132395 A1 | 5/2009 | Lam et al. |
| 2009/0276288 A1 | 11/2009 | Hlavac et al. |
| 2010/0017619 A1 | 1/2010 | Errico |
| 2010/0100470 A1 | 4/2010 | Buchanan et al. |
| 2010/0121808 A1 | 5/2010 | Kuhn |
| 2010/0257066 A1 | 10/2010 | Jones et al. |
| 2010/0299252 A1 | 11/2010 | Thomas |
| 2010/0306080 A1 | 12/2010 | Trandal et al. |
| 2010/0325047 A1 | 12/2010 | Carlson et al. |
| 2010/0332373 A1 | 12/2010 | Crabtree et al. |
| 2010/0332583 A1 | 12/2010 | Szabo |
| 2011/0066505 A1 | 3/2011 | Hammad |
| 2011/0106775 A1 | 5/2011 | Arbo et al. |
| 2011/0131130 A1 | 6/2011 | Griffin et al. |
| 2011/0145056 A1 | 6/2011 | Sullivan et al. |
| 2011/0213686 A1 | 9/2011 | Ferris et al. |
| 2011/0275344 A1 | 11/2011 | Momtahan et al. |
| 2012/0010933 A1 | 1/2012 | Satyavolu et al. |
| 2012/0016858 A1 | 1/2012 | Rathod |
| 2012/0122570 A1 | 5/2012 | Baronoff |
| 2012/0155296 A1 | 6/2012 | Kashanian |
| 2012/0173700 A1 | 7/2012 | De Andrade Cajahyba et al. |
| 2012/0179564 A1 | 7/2012 | Soroca et al. |
| 2012/0185368 A1 | 7/2012 | Schloter et al. |
| 2012/0197794 A1 | 8/2012 | Grigg et al. |
| 2012/0215640 A1 | 8/2012 | Ramer et al. |
| 2012/0221446 A1 | 8/2012 | Grigg et al. |
| 2012/0330971 A1 | 12/2012 | Thomas et al. |
| 2013/0006883 A1 | 1/2013 | McKeown et al. |
| 2013/0024203 A1 | 1/2013 | Flores et al. |
| 2013/0041819 A1 | 2/2013 | Khasho |
| 2013/0054681 A1 | 2/2013 | Coyne |
| 2013/0080641 A1 | 3/2013 | Lui et al. |
| 2013/0110640 A1 | 5/2013 | Powell et al. |
| 2013/0176908 A1 | 7/2013 | Baniel et al. |
| 2013/0227027 A1 | 8/2013 | May et al. |
| 2013/0262312 A1 | 10/2013 | Carlson et al. |
| 2013/0325598 A1 | 12/2013 | Shao et al. |
| 2013/0325681 A1 | 12/2013 | Somashekar et al. |
| 2013/0325769 A1 | 12/2013 | Downs et al. |
| 2014/0025491 A1 | 1/2014 | Nagarajan et al. |
| 2014/0136381 A1 | 5/2014 | Joseph et al. |
| 2014/0172560 A1 | 6/2014 | Satyavolu et al. |
| 2014/0207584 A1 | 7/2014 | Wicha et al. |
| 2014/0236846 A1* | 8/2014 | Melika ................. G06Q 50/184 705/310 |
| 2014/0278755 A1 | 9/2014 | Eberl et al. |
| 2014/0279639 A1 | 9/2014 | Cooper et al. |

(56) References Cited

U.S. PATENT DOCUMENTS

| | | |
|---|---|---|
| 2014/0279800 A1 | 9/2014 | Anastasopoulos |
| 2014/0289154 A1 | 9/2014 | Cooper et al. |
| 2014/0289386 A1 | 9/2014 | Vatto et al. |
| 2014/0335819 A1 | 11/2014 | Jahr |
| 2014/0365354 A1 | 12/2014 | Shvarts |
| 2015/0026053 A1 | 1/2015 | Calman et al. |
| 2015/0046307 A1 | 2/2015 | Calman et al. |
| 2015/0079929 A1 | 3/2015 | McNamee et al. |
| 2015/0082458 A1* | 3/2015 | Cooper ............ G06F 21/12 726/27 |
| 2015/0095132 A1 | 4/2015 | Van Heerden et al. |
| 2015/0161671 A1 | 6/2015 | Watkeys |
| 2015/0351075 A1 | 12/2015 | Korver et al. |
| 2015/0379582 A1 | 12/2015 | Jain et al. |
| 2016/0034588 A1 | 2/2016 | Hyatt et al. |
| 2016/0034834 A1 | 2/2016 | Snell et al. |
| 2016/0048698 A1 | 2/2016 | Sahu et al. |
| 2016/0080485 A1 | 3/2016 | Hamedi |
| 2016/0198322 A1 | 7/2016 | Pitis |
| 2016/0267597 A1 | 9/2016 | Johansen et al. |
| 2016/0274744 A1 | 9/2016 | Neumann et al. |
| 2016/0275436 A1 | 9/2016 | Kurjanowicz et al. |
| 2016/0314251 A1 | 10/2016 | Pratsevall Garcia et al. |
| 2016/0353237 A1 | 12/2016 | Shepherd et al. |
| 2016/0353386 A1 | 12/2016 | Sasidharan et al. |
| 2016/0379107 A1 | 12/2016 | Li et al. |
| 2017/0011398 A1 | 1/2017 | Narasimhan |
| 2017/0013440 A1 | 1/2017 | Ostling |
| 2017/0078861 A1 | 3/2017 | McNamee et al. |
| 2017/0236131 A1 | 8/2017 | Nathenson et al. |
| 2018/0018158 A1 | 1/2018 | Kalke et al. |
| 2018/0063018 A1 | 3/2018 | Bosch et al. |
| 2018/0225754 A1 | 8/2018 | Del Vecchio et al. |

FOREIGN PATENT DOCUMENTS

| | | |
|---|---|---|
| CA | 2634626 A1 | 1/2010 |
| CN | 103677488 A | 3/2014 |
| WO | 2004023451 A1 | 3/2004 |
| WO | 2006107799 A1 | 10/2006 |
| WO | 2007014201 A2 | 2/2007 |
| WO | 2008072255 A2 | 6/2008 |
| WO | 2008076997 A1 | 6/2008 |
| WO | 2010/045059 A1 | 4/2010 |
| WO | 2011/068791 A1 | 6/2011 |
| WO | 2014153128 A1 | 9/2014 |
| WO | 2014157891 A1 | 10/2014 |
| WO | 2014200692 A1 | 12/2014 |

OTHER PUBLICATIONS

Merriam Webster's Collegiate Dictionary, 10th Edition, Merriam-Webster, Incorporated, Springfield, MA, © 2000, p. 47.

* cited by examiner

```
                                                    600

┌─────────────────────────────────────────────────────────┐
│      MODIFY THE AT LEAST ONE THIRD PARTY INTERACTION    │
│                          602                            │
└─────────────────────────────────────────────────────────┘
                            │
                            ▼
┌─────────────────────────────────────────────────────────┐
│ TRIGGER TRANSMISSION OF COMMAND TO PROMPT THE USER TO   │
│ PROVIDE A REASON FOR MODIFYING THE AT LEAST ONE THIRD   │
│                  PARTY INTERACTION                      │
│                          604                            │
└─────────────────────────────────────────────────────────┘
                            │
                            ▼
┌─────────────────────────────────────────────────────────┐
│ PROMPT THE USER TO PROVIDE A REASON FOR MODIFYING THE   │
│              AT LEAST ON THIRD PARTY INTERACTION        │
│                          606                            │
└─────────────────────────────────────────────────────────┘
                            │
                            ▼
┌─────────────────────────────────────────────────────────┐
│ RECEIVE THE USER REASON FOR MODIFYING THE AT LEAST ONE  │
│              THIRD PARTY INTERACTION                    │
│                          608                            │
└─────────────────────────────────────────────────────────┘
                            │
                            ▼
┌─────────────────────────────────────────────────────────┐
│ STORE THE USER REASON AND THE USER IDENTIFYING          │
│              INFORMATION IN THE DATABASE                │
│                          610                            │
└─────────────────────────────────────────────────────────┘
                            │
                            ▼
┌─────────────────────────────────────────────────────────┐
│ PRESENT THE USER REASON AND THE USER IDENTIFYING        │
│              INFORMATION TO A SECOND USER               │
│                          612                            │
└─────────────────────────────────────────────────────────┘
```

FIGURE 6

SYSTEM FOR AUTOMATICALLY ESTABLISHING AN OPERATIVE COMMUNICATION CHANNEL TO TRANSMIT INSTRUCTIONS FOR CANCELING DUPLICATE INTERACTIONS WITH THIRD PARTY SYSTEMS

BACKGROUND

A user may be enrolled in multiple subscriptions for products and services. There is a present need for a system which manages user subscriptions by identifying and canceling duplicate subscriptions while monitoring for potential duplicate subscriptions which may arise in the future.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method, and computer program product for automatically identifying and modifying duplicate third party interactions associated with a user.

In some embodiments, the system identifies duplicate third party interactions based on information extracted from multiple resources associated with an enrolled user. Furthermore, the system may automatically modify a duplicate third party interaction upon identification, wherein the system may even cancel the duplicate third party interaction by interrupting payments to the third party provider associated with the duplicate interaction. This allows for duplicate interactions to be canceled on behalf of the user without the system knowing user login information associated with the third party interaction. Additionally, the system may provide options for modifying duplicate interactions to the user by way of actionable notifications on the user's computing device via a client application. The system may also provide the user with reasons for why similarly-situated users modified or canceled third party interactions.

In some embodiments, the invention identified potential duplicate subscriptions and eliminates duplicate payments. For example, if a user has an account with Merchant 1 being billed to Account 1 and a second Merchant 1 account being billed to Account 2, the system may recognize the duplicate accounts and may automatically cease payment on the oldest account and/or notify the user of the duplicate accounts and seek user confirmation of cancellation or alternative mitigation actions for the duplication. The system may also differentiate between the benefits of Account 1 and Account 2 and provide offers for alternative products/services that have equal or comparable value such as downgrading a plan, utilities, alternatives for Merchant accounts, or the like. The invention may provide alerts to the user that indicate why similarly situated users cancelled or modified their plans or accounts.

Embodiments of the invention relate to systems, methods, and computer program products for modifying duplicate third party interactions, the system comprising: a memory device with computer-readable program code stored thereon; a communication device; a processing device operatively coupled to the memory device and the communication device, wherein the processing device is configured to execute the computer-readable program code to: transmit a client application to a user computing device associated with a user; receive authorization from the user computing device via the client application to access user resources associated with the user, the client application being configured to present a graphical user interface configured to receive authorization from the user; based on receiving authorization to access the user resources, extract information from the user resources, wherein the information extracted from the user resources comprises information associated with third party interactions between the user and one or more third parties, wherein the third party interactions comprise subscriptions and memberships; store the information associated with the third party interactions between the user and the one or more third parties in a database; identify that at least one third party interaction is a duplicate third party interaction based on the information associated with the third party interactions stored in the database; trigger, based on identifying that at least one third party interaction is a duplicate third party interaction, transmission of a command configured to modify the at least one third party interaction; and modify the at least on third party interaction.

In some embodiments, modifying the at least one third party interaction comprises interrupting one or more payments for the at least one third party interaction, wherein the at least one third party interaction is canceled.

In some embodiments, the processing device is further configured to execute the computer-readable program code to: continuously monitor the user resources for a pending third party interaction; identify that the pending third party interaction is a potential duplicate third party interaction based on the information associated with the third party interactions stored in the database; place a hold on a payment from the user resources for the pending third party interaction; transmit an actionable notification to the user computing device, via the client application, wherein the actionable notification presents the pending third party interaction and allows the client application to receive user instructions for modifying the pending third party interaction; receive from the user computing device, via the client application, the user instructions for modifying the pending third party interaction; trigger, based on receiving the user instructions from the user computer device, transmission of a command configured to modify the pending third party interaction; and modify the pending third party interaction, wherein modifying the pending third party interaction comprises at least one of allowing the payment and denying the payment.

In some embodiments, modifying the at least one third party interaction comprises: transmitting an actionable notification to the user computing device, via the client application, wherein the actionable notification presents the at least one third party interaction and allows the client application to receive user instructions for modifying the at least one third party interaction; receiving from the user computing device, via the client application, the user instructions for modifying the at least one third party interaction; triggering, based on receiving the user instructions from the user computing device, transmission of a command configured to modify the at least one third party interaction; and modifying the at least one third party interaction.

In some embodiments, transmitting an actionable notification to the user computing device further comprises: establishing an operative communication channel with one or more third party systems; extracting benefits associated with the third party interactions from the one or more third party systems, wherein the benefits comprise reward points, earned credit, and membership status; triggering, based on identifying the benefits associated with the third party interactions, transmission of a command configured to cause the user computing device to present the benefits to the user via the client application; and presenting the benefits to the user via the client application.

In some embodiments, transmitting an actionable notification to the first user computing device further comprises: establishing an operative communication channel with one or more third party systems; extracting interaction information from the one or more third party systems; identifying one or more alternative interactions based on the interaction information extracted from the one or more third party systems, wherein the one or more alternative interactions are provided by different third party providers than a preexisting third party interaction associated with the user; and triggering, based on identifying the one or more alternative interactions, transmission of a command configured to cause the user computing device to present the one or more alternative interactions to the user via the client application; and presenting the one or more alternative interactions to the user via the client application.

In some embodiments, the one or more alternative interactions comprise different subscription terms than the preexisting third party interaction associated with the user.

In some embodiments, the processing device is further configured to execute the computer-readable program code to: trigger, based on modifying the at least one third party interaction, transmission of a command configured to cause the user computing device to prompt the user, via the client application, to provide a reason for modifying the at least one third party interaction; prompt the user, via the client application, to provide the reason for modifying the at least one third party interaction; receive from the user computing device, via the client application, the user reason for modifying the at least one third party interaction; store the user reason in the database; and present the user reason to a second user, wherein the second user is deciding how to modify a third party interaction similar to the at least one third party interaction associated with the user.

In some embodiments, providing the user reason and the user identifying information associated with the user to the second user further comprises: extracting user identifying information associated with the user from the user resources, wherein user identifying information comprises location; extracting user identifying information associated with the second user from second user resources associated with the second user; comparing the user identifying information associated with the user with user identifying information associated with the second user; and determining that the second user is similar to the user based on comparing the user identifying information associated with the user with the user identifying information associated with the second user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
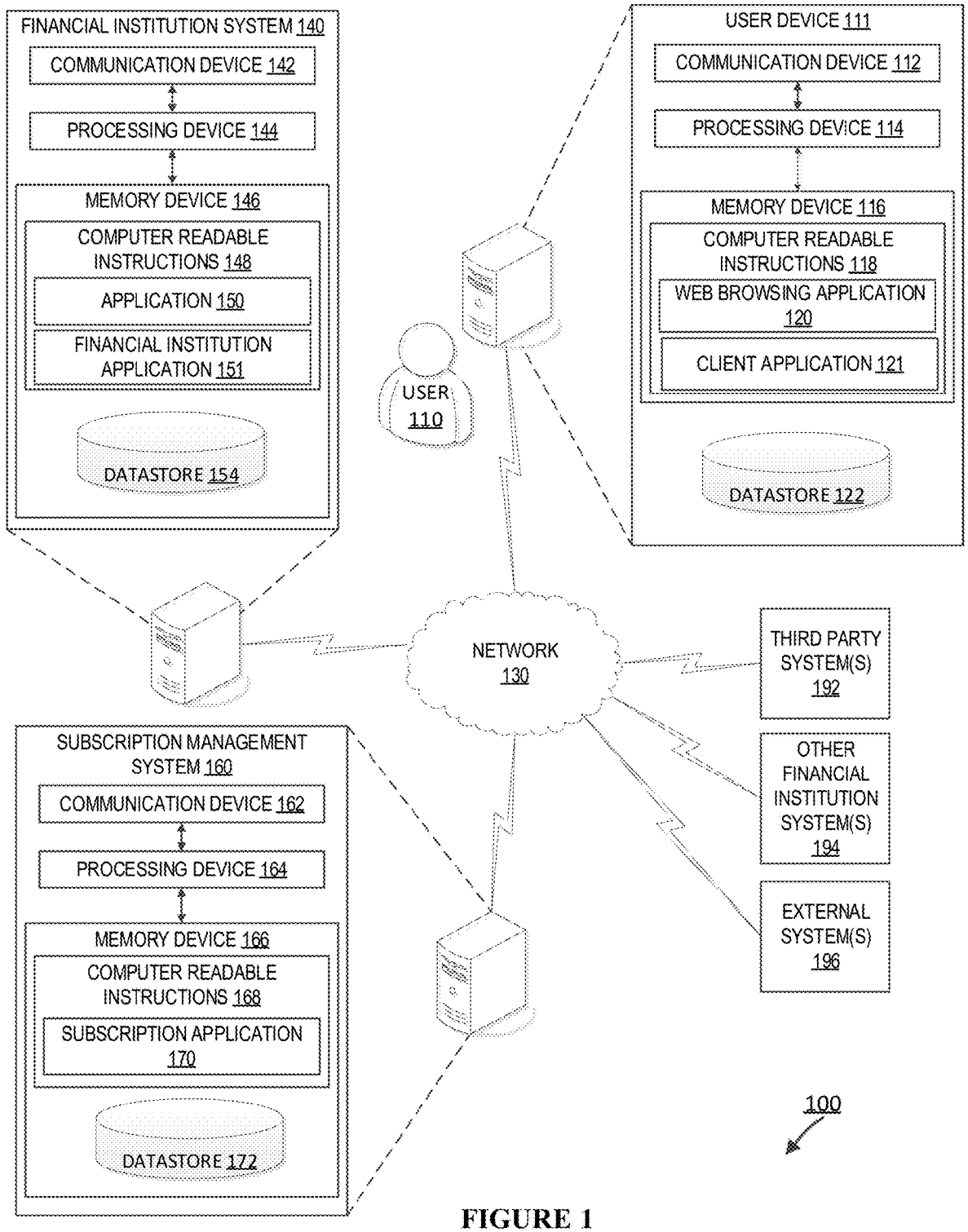
Figure 2A:
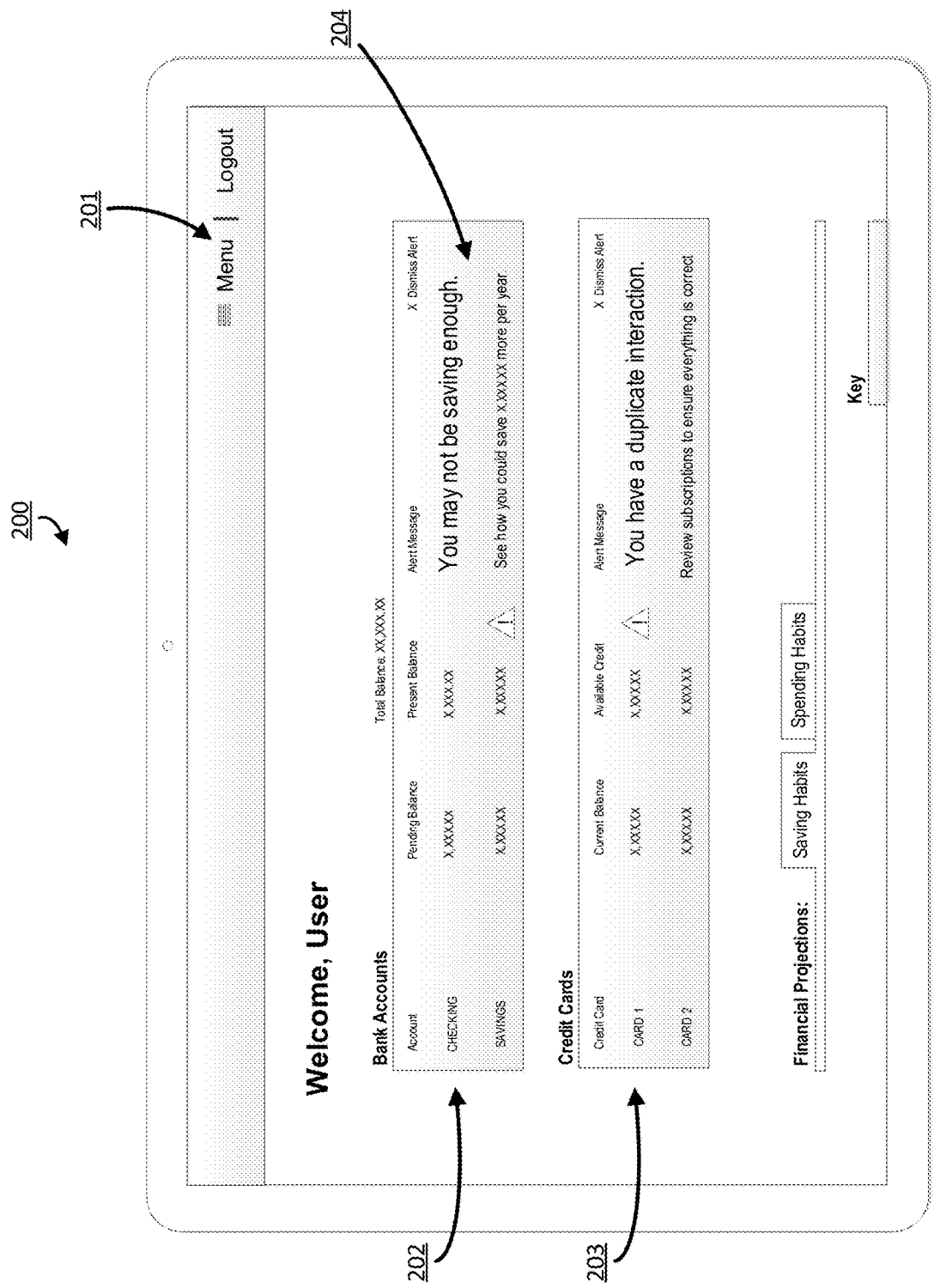
Figure 2B:
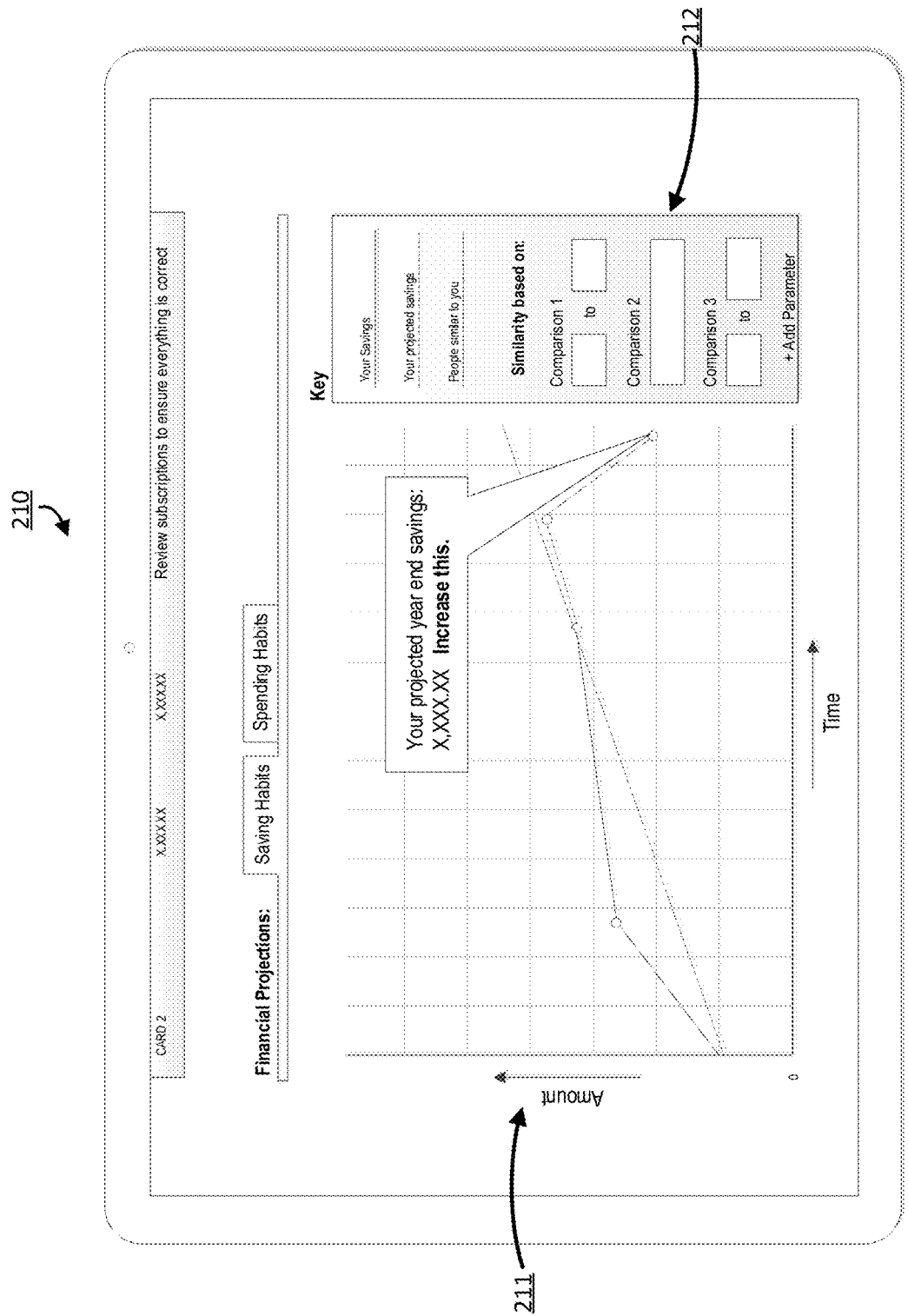
Figure 2C:
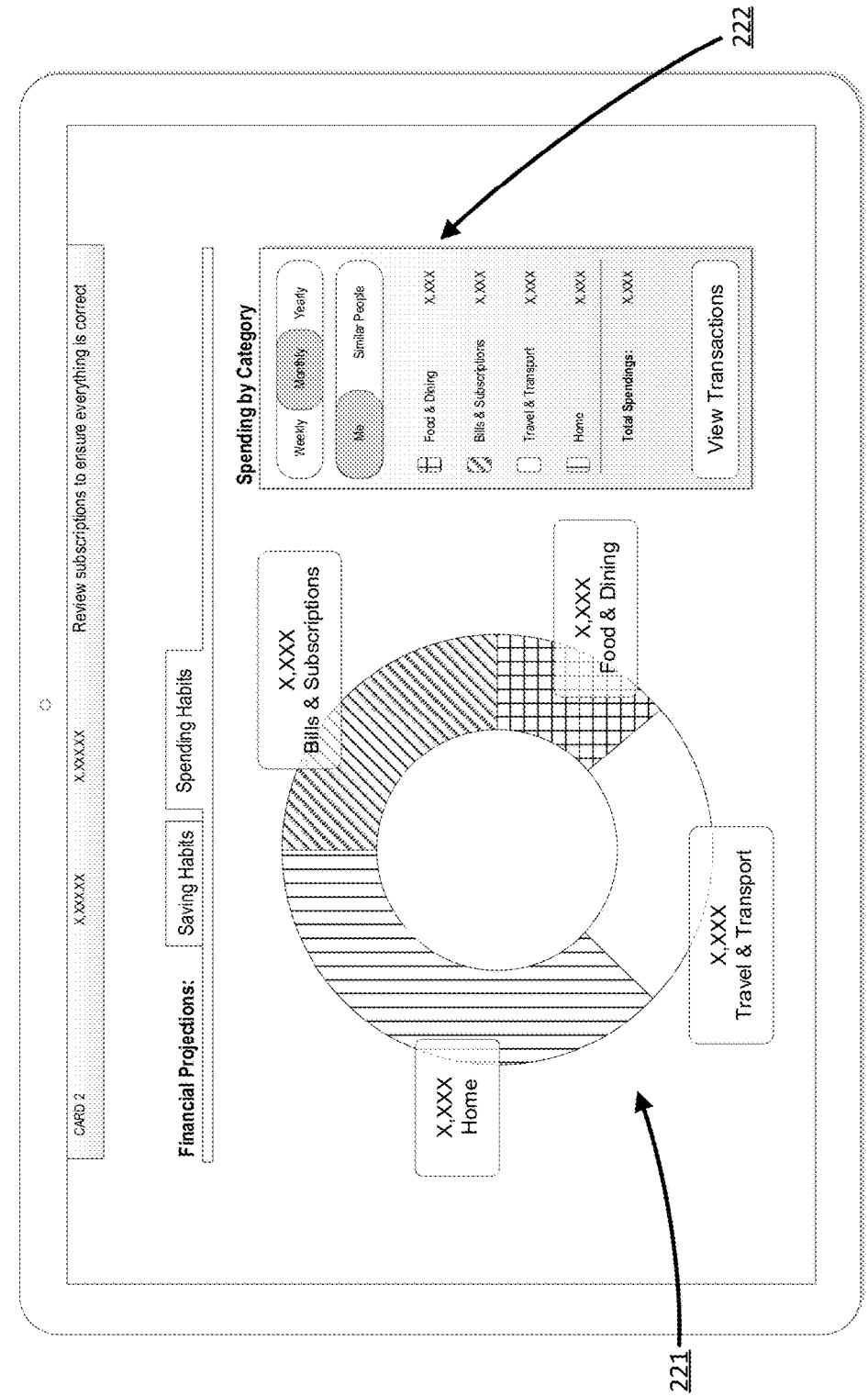
Figure 2D:
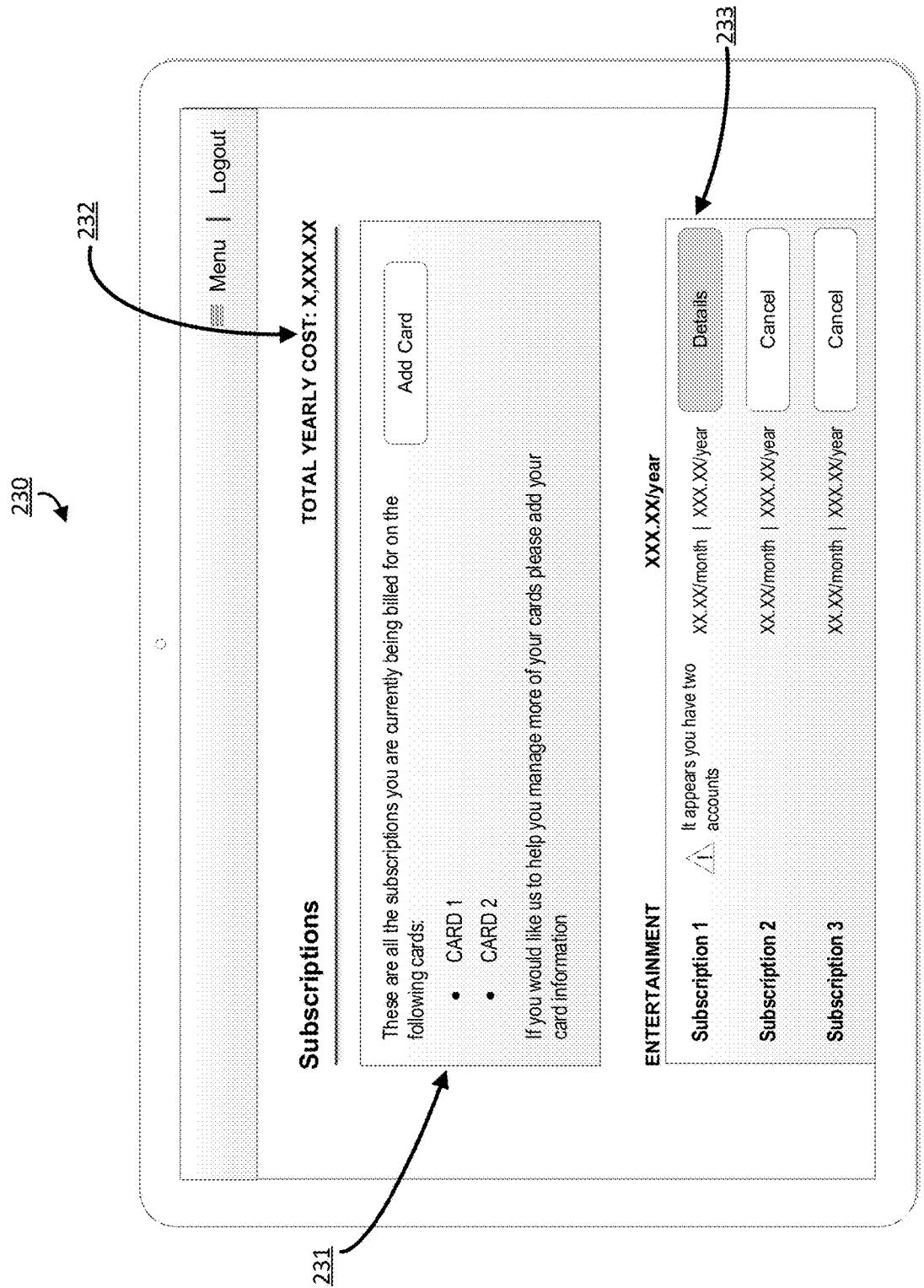
Figure 3:
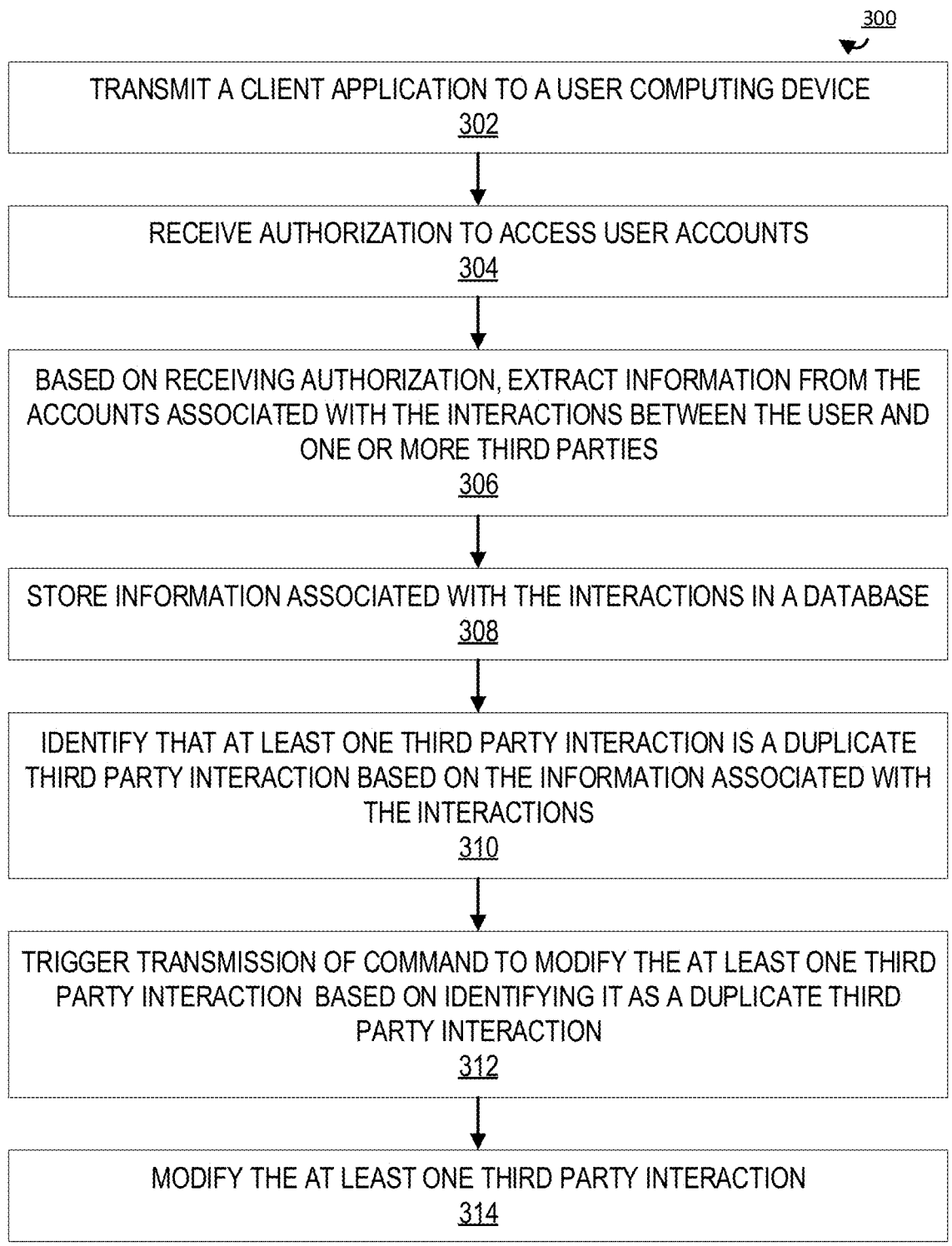
Figure 4:
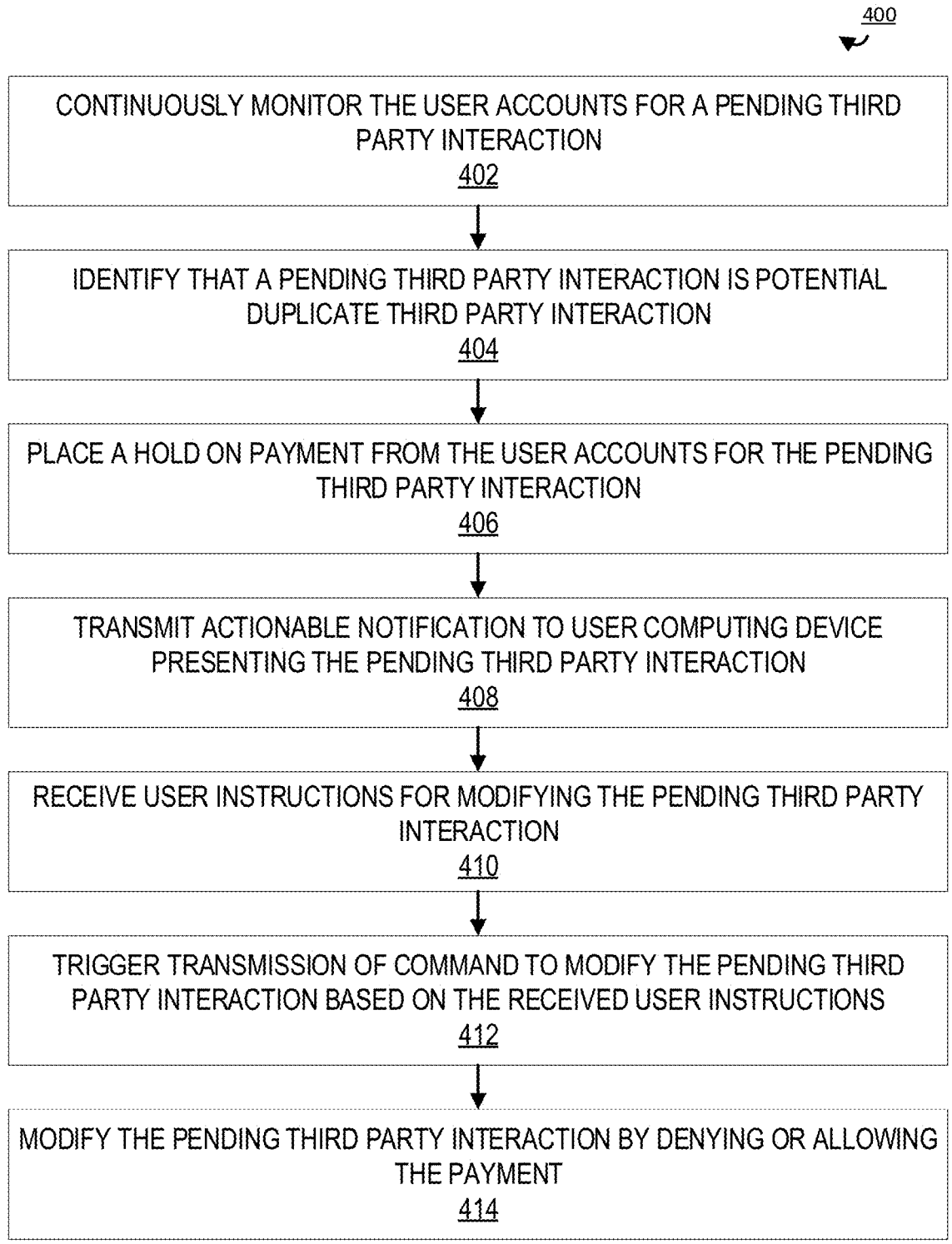
Figure 5:
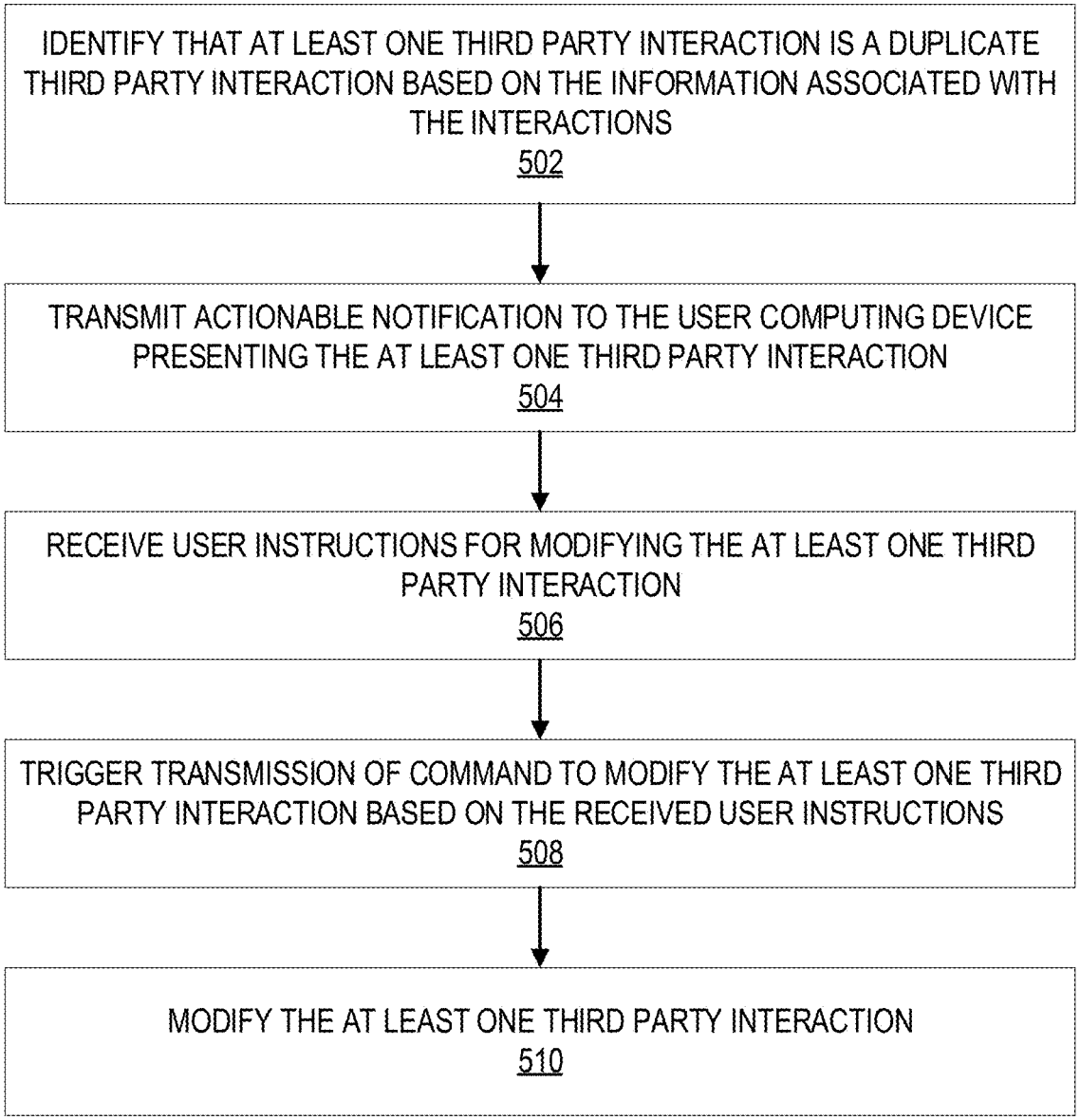

Having thus described embodiments of the invention in general terms, reference will now be made to the accompanying drawings, wherein:

FIG. 1 provides a system environment in which embodiments of the invention operate, in accordance with one embodiment of the present invention;

FIG. 2A illustrates a graphical representation of a portion of an application user interface, in accordance with some embodiments of the invention;

FIG. 2B illustrates a graphical representation of a portion of an application user interface for monitoring resource savings, in accordance with some embodiments of the invention;

FIG. 2C illustrates a graphical representation of a portion of an application user interface for monitoring resource spending, in accordance with some embodiments of the invention;

FIG. 2D illustrates a graphical representation of a portion of an application user interface for monitoring subscriptions, in accordance with some embodiments of the invention;

FIG. 3 provides a high level process flow for modifying duplicate third party interactions, in accordance with one embodiment of the invention;

FIG. 4 provides a high level process flow for continuously monitoring and modifying pending interactions for an enrolled user, in accordance with one embodiment of the invention;

FIG. 5 provides a high level process flow for transmitting an actionable notification to the user computing device in order to modify a third party interaction, in accordance with one embodiment of the invention; and FIG. 6 provides a high level process flow for collecting information related to a user modifying a third party interaction and providing said information to a similar second user.

DETAILED DESCRIPTION OF THE INVENTION

The present invention addresses a problem which arises as a result of online banking and electronic payment, specifically, the problem of automatic, electronic subscription renewals which may not be observed with scrutiny by users with several different subscriptions or memberships spread out among multiple payment accounts which, in the modern day, are primarily managed electronically through mobile and computing devices. The present invention addresses this problem by ultimately leading to the interruption of payment from a user account directed to a third party provider's system, thus terminating the third party interaction between the user and the third party provider. Additionally, in this process, the present invention does not require the user's login information for an account associated with the third party interaction that the user wishes to cancel. As such, this solution proves beneficial for a user who wishes to terminate an interaction, such as a subscription, wherein the user has forgotten the login information for the interaction account or even forgotten and/or confused the login information among the user's various other login credentials for other online accounts. With the present invention, this information, which would normally be required, is not necessary to cancel the interaction.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user record that includes information associated with the user, or the like. The account is associated with and/or maintained by the entity. The terms "resource" and "account" may be used interchangeably. "resources" include accounts of the user and/or other property owned by the user. The resources may be associated with accounts or may be property that is not associated with a specific account. Examples of resources associated with accounts may be accounts that have cash or cash equivalents, or accounts that are funded with or contain property, such as safety despots box account that jewelry, a trust account that is funded with property, or the like. Examples of resources that may not be associated with accounts may be antiques in a user's home, jewelry in a user's home, or the like. "Authentication information" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system.

An "entity" as used herein may be a financial institution. In some embodiments, the entity may allow a user to establish an account with the entity. For the purposes of this invention, a "financial institution" is any organization, entity, or the like in the business of moving, investing, or lending money, dealing in financial instruments, or providing financial services. This may include commercial banks, thrifts, federal and state savings banks, savings and loan associations, credit unions, investment companies, credit card companies, insurance companies and the like. A "financial event" or "life event" may be any immediate or future event that causes a change in a user's financial status. A financial event may be a transaction, and exchange, or the like that may cause the user to lose or gain money and/or resources. Examples of financial events or life events include a medical expense, buying a house, college tuition, rent, moving to a new city, receiving a raise or bonus in pay and the like. To "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

A "transaction" refers to any communication between a user and the financial institution or other entity monitoring the user's activities. A transaction may also refer to any communication between a user and a third party. For example, a transaction may refer to a purchase of goods or services, a return of goods or services, a payment transaction, a credit transaction, or other interaction involving a user's account. In the context of a financial institution or third party, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, digital items and the like); making payments to creditors (e.g., paying monthly bills; paying federal, state, and/or local taxes; and the like); sending remittances; loading money onto stored value cards (SVCs) and/or prepaid cards; donating to charities; and/or the like. An "interaction" as used herein refers to any recurring or fixed term payment and/or agreement between a user and an entity for a product and/or service provided to the user by the entity. For example, an interaction may be a subscription, a membership, a utility service and the like. An interaction may refer to a free, on-going relationship between a user and an entity such as a trial offer, a rewards club, and the like. An interaction may also refer to a one-time payment. The term "interaction" may be used interchangeably with "transaction" and, where applicable, the term "subscription."

A "user" may be a financial institution customer (e.g., an account holder or a person who have an account (e.g., banking account, credit account, or the like)). In one aspect, a user may be any financial institution customer involved managing spending and accounts with the financial institution or any other affiliate entities associated with the financial institution. In some embodiments, the user may be an individual who may be interested in opening an account with the financial institution. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably. A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Referring now to FIG. 1, the figure illustrates a processing system environment 100, in accordance with some embodiments of the invention. The environment 100 includes a user device 111 associated or used with authorization of a user 110 (e.g., an account holder, a mobile application user, a bank customer, and the like), a subscription management system 160, and a financial institution system 140. In some embodiments, the subscription management system 160 corresponds to a third party financial institution. The environment 100 further includes one or more third party systems 192 (e.g., a partner, agent, or contractor associated with a financial institution), one or more other financial institution systems 194 (e.g., a credit bureau, third party banks, and so forth), and one or more external systems 196 comprising components similar to the other systems.

The systems and devices communicate with one another over the network 130 and perform one or more of the various steps and/or methods according to embodiments of the disclosure discussed herein. The network 130 may include a local area network (LAN), a wide area network (WAN), and/or a global area network (GAN). The network 130 may provide for wireline, wireless, or a combination of wireline and wireless communication between devices in the network. In one embodiment, the network 130 includes the Internet.

The user device 111, the subscription management system 160, and the financial institution system 140 each includes a computer system, server, multiple computer systems and/or servers or the like. The financial institution system 140, in the embodiments shown has a communication device 142 communicably coupled with a processing device 144, which is also communicably coupled with a memory device 146. The processing device 144 is configured to control the communication device 142 such that the financial institution system 140 communicates across the network 130 with one or more other systems. The processing device 144 is also configured to access the memory device 146 in order to read the computer readable instructions 148, which in some embodiments includes one or more applications such as application 150 and financial institution application 151. The memory device 146 also includes a datastore 154 or database for storing pieces of data that can be accessed by the processing device 144.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 114, 144, or 164 may further include functionality to operate one or more software programs based on computer-executable program code thereof, which may be stored in a memory. As the phrase is used herein, a processing device 114, 144, or 164 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 146 includes any computer memory that provides an actual or virtual space to temporarily or permanently store data and/or commands provided to the processing device 144 when it carries out its functions described herein.

The user device 111 includes a communication device 112 communicably coupled with a processing device 114, which is also communicably coupled with a memory device 116. The processing device 114 is configured to control the communication device 112 such that the user device 111 communicates across the network 130 with one or more other systems. The processing device 114 is also configured to access the memory device 116 in order to read the computer readable instructions 118, which in some embodiments includes application 120 and client application 121. In some embodiments, the client application 121 and the other applications provide a graphical user interface (GUI) on a display that allows the user 110 to communicate with the user device 111 and/or other devices or systems. The memory device 116 also includes a datastore 122 or database for storing pieces of data that can be accessed by the processing device 114. The user device 111 may be a mobile device of the user 110, a bank teller device, a third party device, an automated teller machine, a video teller machine, or another device capable of capturing a check image.

The subscription management system 160 includes a communication device 162 communicably coupled with a processing device 164, which is also communicably coupled with a memory device 166. The processing device 164 is configured to control the communication device 162 such that the subscription management system 160 communicates across the network 130 with one or more other systems. The processing device 164 is also configured to access the memory device 166 in order to read the computer readable instructions 168, which in some embodiments includes a subscription application 170 configured to monitor and manage interactions associated with the user 110. The memory device 166 also includes a datastore 172 or database for storing pieces of data that can be accessed by the processing device 164.

The present invention aggregates user resources from multiple different entities into a single, centralized database allowing for efficient storage of information and data that would normally need to be requested from outside systems when called upon by the processes of the system. Furthermore, data from third party interaction providers is extracted by the system and stored in the database for quick-access and reference. The system's centralized storage of information allows for efficient access to aggregated data which further allows for the processing power of the computing device to be made available for additional or other tasks.

In some embodiments, the application 120, the client application 121, and the application 170 interact with the application 150 or 151 to receive or provide financial data, analyze financial record data, and implement business strategies, transactions, and processes. The applications 150 and 151 may be a suite of applications for performing these functions. In some embodiments, the application 120, the client application 121, and the application 170 interact with the applications 150 and 151 to utilize metadata to determine decisions for processing.

Described throughout much of the present application, the subscription management application 170, in some embodiments, transmits a client application 121 to the user computing device 111. In some embodiments, when the user 110 decides to enroll in the mobile or online banking program, the user 110 downloads or otherwise obtains the client application 121 from the financial institution system 140, the subscription management system 160, and/or a distinct application server, the client application 121 being configured to operate as a mobile application and/or an online banking application. In other embodiments, the user 110 may interact with the other systems via a web browsing application 120 in addition to, or instead of, the client application 121.

In some embodiments, the subscription management application 170 receives authorization from the user device 111 via the client application 121 to access and extract data from accounts associated with the user 110. In one embodiment of the invention, the client application 121 presents a GUI to the user 110 to receive authorization for access to the user accounts and/or authentication information associated with the user accounts. The user 110 may be prompted to provide account details such as account numbers, credit card numbers, login information such as usernames, passwords, and security codes, and the like associated with the user accounts being accessed by the application 170. In other embodiments, the user 110 is a customer of the financial institution, wherein the user accounts are maintained by the financial institution and automatically associated with the user 110 within the subscription management application 170. In some embodiments, the user accounts are maintained by a third party such as a third party financial institution, wherein the application 170 establishes an operative communication channel to the third party system 192 upon receiving authorization and/or authentication information from the user 110. In some embodiments, the application 170 stores information and/or data associated with the user accounts maintained by the third party in the database.

In some embodiments, based on receiving authorization from the user device 111, the subscription management application 170 extracts information from the user accounts. The information extracted by the application 170 from the user accounts comprises information associated with interactions associated with the user 110. In some embodiments, the interactions associated with the user 110 are third party interactions between the user 110 and one or more third parties. In some embodiments, the application 170 may identify keywords in the extracted information to identify interactions associated with the user 110. In other embodiments, the application 170 may prompt the user 110 via the client application to indicate transactions associated with third party interactions and/or provide the name of a third party interaction associated with the user 111. In some embodiments, the application 170 may identify that a payment is regularly made to the same third party provider and determine that the payments comprise an interaction between the user 110 and the third party provider.

In some embodiments, the subscription management application 170 stores the extracted information associated with the third party interactions between the user 110 and one or more third parties in a database. In some embodiments, the information is stored in a centralized database, wherein information associated with one or more transactions are stored in a single location, reducing the time needed to search for a particular transaction or series of transactions related to one or more interactions.

In some embodiments, the subscription management application 170 identifies that a third party interaction is a duplicate third party interaction based on the information associated with the third party interactions extracted from the user accounts and stored in the database. The application 170 compares the extracted interaction information from all accessible user accounts associated with the user to determine if a third party interaction is repeated. In some embodiments, the application 170 compares extracted interaction information such as a payment amount, the name of the third party provider receiving the payment, the frequency of payments, and the like.

In some embodiments, based on identifying that at least one third party interaction is a duplicate third party interaction, the subscription management application 170 triggers the transmission of a command configured to modify the at least one third party interaction that was identified as a duplicate third party interaction.

In some embodiments, the subscription management application 170 modifies the at least one third party interaction that was identified as a duplicate interaction. In some embodiments, modifying the at least one third party interaction comprises automatically cancelling a third party interaction after the application 170 identifies the third party interaction as a duplicate interaction. In some embodiments of the invention, the application 170 cancels the duplicate third party interaction by interrupting one or more payments from the user accounts for the duplicate third party interaction. In this embodiment, the duplicate third party interaction may be canceled without requiring input from the user and/or requiring user account information associated with the duplicate third party account. In other embodiments, modifying the at least one third party interaction comprises upgrading or downgrading the interaction by altering the subscription terms to a new subscription plan, wherein altering the subscription terms comprises altering the recurring payment amount for a subscription, altering the services and/or products offered through the subscription, and/or altering the subscription provider.

In some embodiments, the subscription management application 170 transmits an actionable notification to the user device 111 which presents the user 110 with the at least one third party interaction previously identified by the application 170. The notification is transmitted to the user device 111 via the client application which allows the user to interact with the actionable notification and input user instructions for modifying the at least one third party interaction identified as a duplicate third party interaction. In some embodiments, the actionable notification is an in-line alert integrated into the user's transactions and/or account status displayed in the client application or other account management interface. In some embodiments, the actionable notification provides means for the user 110 to accept or decline the modification of a third party interaction such as interactive button options displayed by the client interface. In some embodiments, the actionable notification provides means for the user 110 to accept or decline canceling a third party interaction.

In some embodiments, the subscription management application 170 receives the user's instructions for modifying the at least one third party interaction from the user device via the client application.

In some embodiments, based on receiving the user instructions from the user device 111 via the client application, the subscription management application 170 triggers the transmission of a command configured to modify the at least one third party interaction identified as a duplicate third party interaction and then modifies the at least one third party interaction according to the received user instructions. In some embodiments, modifying the at least one third party interaction comprises cancelling the interaction, upgrading the interaction, downgrading the interaction, and/or changing the interaction provider.

In some embodiments, the subscription management application 170 continuously monitors the activity of the user accounts for additional, pending third party interactions. In some embodiments, the application 170 allows for the user 110 to add and authorize an additional user account via the client application that was not previously added or authorized during user enrollment.

In some embodiments, the subscription management application 170 identifies a pending third party application and determines that it is a potential duplicate third party interaction based on the information associated with the third party interactions stored in the database. Details of the pending third party interaction are extracted and compared to the other third party interactions already associated with the user 110 to determine potential duplicate third party interactions.

In some embodiments, the subscription management application 170 places a hold on payments from the user accounts for the pending third party interaction identified as a potential duplicate interaction.

In some embodiments, the subscription management application 170 transmits an actionable notification to the user device 111 via the client application, the actionable notification being configured to present the pending third party interaction to the user 110, wherein the actionable notification allows for the user 110 to interact with the notification on the user device 111 via the client application to provide user instructions for modifying or taking action on the pending third party interaction. In some embodiments, the user 110 is prompted to select whether to allow or deny payment for the pending third party application. In some embodiments, the actionable notification may present to the user 110 details associated with the pending third party interactions such as a description, a subscription cost, the name of the third party provider associated with the interaction, products and/or services provided by the interaction, and/or the like. In some embodiments, the application 170 may additionally present the one or more third party interactions associated with the user 110 of which the pending third party interaction was identified as a potential duplicate along with details associated with the one or more third party interactions.

In some embodiments, the subscription management application 170 receives user instructions from the user device 111 via the client application for modifying the pending third party interaction and, based on receiving the user instructions from the user device 111 via the client application, triggers the transmission of a command configured to modify the pending third party interaction, wherein the application 170 modifies the pending third party interaction according to the received user instructions. In some embodiments, the application 170 modifies the pending third party interaction by allowing or denying the payment that was previously placed on hold to the third party provider associated with the pending interaction. In some embodiments of the invention, the application 170 may not transmit an actionable notification to the user 110 and instead automatically modify the pending third party interaction after identifying it as a duplicate third party interaction of another third party interaction already associated with the user 110. In some embodiments, the application 170 modifies the older third party interaction already associated with the user 110 instead of the pending third party interaction. In some embodiments, modifying the at least one third party interaction comprises cancelling the interaction, upgrading the interaction, downgrading the interaction, and/or changing the interaction provider.

In some embodiments, the application 170 triggers the transmission of a command configured to cause the user device 111 to prompt the user 110, via the client application, to provide a reason for modifying the at least one third party interaction, wherein the application 170 prompts the user 110 to provide the reason for modifying the at least one third party interaction. The application 170 may request that the user 110 input a response for modifying the third party interaction.

In some embodiments, the subscription management application 170 receives the user's reason for modifying the at least one third party interaction and subsequently stores the user's reason for modifying the third party interaction in the database for future reference.

In some embodiments, the subscription management application 170 presents the user's reason for modifying the third party interaction to a second user. In some embodiments, the second user is in the process of deciding how to modify a third party interaction associated with the second user that is similar or essentially equivalent to the third party interaction that the user modified.

The applications 120, 121, 150, 151, and 170 are for instructing the processing devices 114, 144 and 164 to perform various steps of the methods discussed herein, and/or other steps and/or similar steps. In various embodiments, one or more of the applications 120, 121, 150, 151, and 170 are included in the computer readable instructions stored in a memory device of one or more systems or devices other than the systems 160 and 140 and the user device 111. For example, in some embodiments, the application 120 is stored and configured for being accessed by a processing device of one or more third party systems 192 connected to the network 130. In various embodiments, the applications 120, 121, 150, 151, and 170 stored and executed by different systems/devices are different. In some embodiments, the applications 120, 121, 150, 151, and 170 stored and executed by different systems may be similar and may be configured to communicate with one another, and in some embodiments, the applications 120, 121, 150, 151, and 170 may be considered to be working together as a singular application despite being stored and executed on different systems.

In various embodiments, one of the systems discussed above, such as the financial institution system 140, is more than one system and the various components of the system are not collocated, and in various embodiments, there are multiple components performing the functions indicated herein as a single device. For example, in one embodiment, multiple processing devices perform the functions of the processing device 144 of the financial institution system 140 described herein. In various embodiments, the financial institution system 140 includes one or more of the external systems 196 and/or any other system or component used in conjunction with or to perform any of the method steps discussed herein. For example, the financial institution system 140 may include a financial institution system, a credit agency system, and the like.

In various embodiments, the financial institution system 140, the subscription management system 160, and the user device 111 and/or other systems may perform all or part of a one or more method steps discussed above and/or other method steps in association with the method steps discussed above. In some embodiments, the subscription management system 170 is maintained and/or operated by a financial institution. In some embodiments of the invention, the financial institution system 140 and the subscription management system 170 are combined, wherein the subscription management system 170 is part of the financial institution system 140. Furthermore, some or all the systems/devices discussed here, in association with other systems or without association with other systems, in association with steps being performed manually or without steps being performed manually, may perform one or more of the steps of one or more of the method discussed herein, or other methods, processes or steps discussed herein or not discussed herein.

Referring now to FIG. 2A, the figure illustrates a graphical representation of a portion of a banking application user interface 200, in accordance with some embodiments of the invention. In some embodiments of the invention, the banking application of FIGS. 2A, 2B, 2C, and 2D is the client application 121. The user interface allows the user 110 to input information, such as commands or data, into the user device 111, and allows the user device 111 to output information to the user. As illustrated in FIG. 2A, in some embodiments, the application presents the user 110 with means for navigating the interface by providing a menu 201. The menu 201 may be a drop-down menu which provides the user 110 with additional interactive selections for navigation within the application. Furthermore, the menu provides a logout option which allows the user 110 to exit the application. Upon logging out or initially launching the application, the user 110 may be prompted by the application to provide authentication information to log in. In some embodiments, the application may provide the user 110, via the user interface, with information related to one or more accounts or resources associated with the user 110 such as bank accounts 202, credit card accounts 203, and the like. The application my additionally provide actionable alerts or notifications 204 to the user 110 such as alerts regarding savings goals, budgets, offers for goods or services and the like. In some embodiments, the alerts may be in-line with the account information associated with the user 110 or even be presented along with individual transactions. In some embodiments, the user 110 may optionally toggle the appearance of alerts so that they may or may not be displayed via the user interface.

Referring now to FIG. 2B, the figure illustrates a graphical representation of a portion of a banking application user interface for monitoring resource savings 210, in accordance with some embodiments of the invention. As illustrated by element 211, the application presents to the user 110, via the user interface, a projection of resource savings by monitoring financial information associated with the one or more user accounts. In some embodiments, the projection is presented to the user via a graph, chart, or the like, wherein the user 110 may modify the scale of time of the record to reflect weekly, monthly, yearly spending or the like. Additionally, the application may provide the user 110 with one or more actionable alerts or notifications to allow the user 110 to modify his or her saving habits. Furthermore, the application may present resource saving habits and projections for other users determined to be similar to the user 110. In some embodiments, the projection of the user's saving habits updates as the system 170 modifies one or more interactions associated with the user 110. In some embodiments, the application provides one or more interactive fields 212 for the input of parameters used determine the other similar users, such as location and the like.

Referring now to FIG. 2C, the figure illustrates a graphical representation of a portion of a banking application user interface for monitoring resource spending 220, in accordance with some embodiments of the invention. As illustrated by element 221, the application presents to the user 110, via the user interface, a record of resource spending by monitoring financial information associated with the one or more user accounts. In some embodiments, the record is presented to the user 110 via a graph, chart, or the like, wherein the user 110 may modify the scale of time of the record to reflect weekly, monthly, yearly spending or the like. Additionally, the application may provide the user 110 with one or more actionable alerts or notifications to allow the user 110 to modify his or her spending habits. Furthermore, the application may present resource spending habits and projections for other users determined to be similar to the user 110. In some embodiments, the projection of the user's saving habits updates as the system 170 modifies one or more interactions associated with the user 110. In some embodiments, the application provides one or more interactive fields 222 for the input of parameters used determine the other similar users, such as location and the like.

Referring now to FIG. 2D, the figure illustrates a graphical representation of a portion of a banking application user interface for monitoring subscriptions 230, in accordance with some embodiments of the invention. As illustrated by element 231, the application user interface displays credit cards, debit cards, payment accounts, and the like used for the payment of one or more subscriptions and the like associated with the user 110. Additionally, the user 110 is presented with a total cost of the one or more subscriptions 232 associated with the user. As illustrated by element 233, the user interface may present the one or more subscriptions to the user 110 and provide actionable alerts or notifications to the user 110 such as alerts that identify duplicate subscriptions associated with the user 110. The application may present additional details associated with the one or more subscriptions such as cost, sign-up date, renewal data, and the like.

Referring now to FIG. 3, the figure provides a high level process flow for modifying duplicate third party interactions, in accordance with one embodiment of the invention. As illustrated in block 302, the process 300 is initiated by first transmitting a client application to the user computing device 111. In some embodiments, when the user 110 decides to enroll in the mobile or online banking program, the user 110 downloads or otherwise obtains the client application 121 from the financial institution system 140, the subscription management system 160, and/or a distinct application server, the client application 121 being configured to operate as a mobile application and/or an online banking application. In other embodiments, the user 110 may interact with the other systems via a web browsing application 120 in addition to, or instead of, the client application 121.

In some embodiments of the invention, the subscription management system 160 requests personal and/or financial information associated with the user 110 while enrolling the user 110 into the subscription management program, wherein the system 160 generates a user-specific record associated with the user 110, the user-specific record containing said personal and/or financial information associated with the user 110. In other embodiments, the user 110 is a customer of the financial institution maintaining the subscription management system 160, wherein the user's 110 personal and/or financial information is already stored within the financial institution system 140. In other embodiments, the system 160 extracts the user's personal and/or financial information from the user accounts added to the system 160 by the user 110.

The process then moves to block 304 of FIG. 3 where the system 160 receives authorization from the user device 111 via the client application 121 to access and extract data from accounts associated with the user 110. In one embodiment of the invention, the client application 121 presents a GUI to the user 110 to receive authorization for access to the user accounts and/or authentication information associated with the user accounts. The user 110 may be prompted to provide account details such as account numbers, credit card numbers, login information such as usernames, passwords, and security codes, and the like associated with the user accounts being accessed by the system 160. In other embodiments, the user 110 is a customer of the financial institution, wherein the user accounts are maintained by the financial institution and automatically associated with the user 110 within the subscription management system 160. In some embodiments, the user accounts are maintained by a third party such as a third party financial institution, wherein the system 160 establishes an operative communication channel to the third party system 192 upon receiving authorization and/or authentication information from the user 110. In some embodiments, the system 160 stores information and/or data associated with the user accounts maintained by the third party in the database.

The process 300 then moves to block 306 of FIG. 3 where based on receiving authorization from the user device 111, the subscription management system 160 extracts information from the user accounts. The information extracted by the system 160 from the user accounts comprises information associated with interactions associated with the user 110. In some embodiments, the interactions associated with the user 110 are third party interactions between the user 110 and one or more third parties. In some embodiments, the system 160 may identify keywords in the extracted information to identify interactions associated with the user 110. In other embodiments, the system 160 may prompt the user 110 via the client application to indicate transactions associated with third party interactions and/or provide the name of a third party interaction associated with the user 111. In some embodiments, the system 160 may identify that a payment is regularly made to the same third party provider and determine that the payments comprise an interaction between the user 110 and the third party provider. For example, the system 160 may identify regular monthly payments being made to a known video-streaming service and determine that the regular payments comprise an interaction between the user 110 and the provider of the video-streaming service.

The process 300 then moves to block 308 of FIG. 3 where the subscription management system 160 stores the extracted information associated with the third party interactions between the user 110 and one or more third parties in a database. In some embodiments, the information is stored in a centralized database, wherein information associated with one or more transactions are stored in a single location, reducing the time needed to search for a particular transaction or series of transactions related to one or more interactions. As the system 160 may extract information from multiple user accounts, the ability to process aggregated interaction information stored in the centralized database may lead to increased efficiency of the system 160 while accessing memory and processing commands.

The process 300 then moves to block 310 of FIG. 3 where the system 160 identifies that a third party interaction is a duplicate third party interaction based on the information associated with the third party interactions extracted from the user accounts and stored in the database. The system 160 compares the extracted interaction information from all accessible user accounts associated with the user to determine if a third party interaction is repeated. In some embodiments, the system 160 compares extracted interaction information such as a payment amount, the name of the third party provider receiving the payment, the frequency of payments, and the like. For example, the system 160 may identify that a subscription to a particular video-streaming service is associated with the user's first credit card and also identify that a second subscription for the same video-streaming service is associated with the user's second credit card.

In some embodiments, the system 160 may identify a similar third party interaction that is essentially equivalent to a third party interaction. The system 160 compares extracted interaction information such as a payment amount, the name of the third party provider receiving the payment, the frequency of payments, and the like to determine the similar third party interactions that are essentially equivalent to the third party interaction. In this way, the system 160 may identify the similar third party interaction as a duplicate when compared to the third party interaction. In some embodiments, the system 160 references a database of known third party interactions to determine essentially equivalent third party interactions, wherein the database comprises details associated with the third party interactions such as products and/or services provided, subscription cost, and the like. For example, the system 160 may identify a first video-streaming service provided by a first provider and a second video-streaming service provided by a second provider as being essentially equivalent and therefore duplicate third party interactions based on the names of the services, the subscription cost of the services, the frequency of payments for the services, the products and/or services provided by the two services, and/or the like.

The process 300 then moves to block 312 of FIG. 3 where based on identifying that at least one third party interaction is a duplicate third party interaction, the subscriptions management system 160 triggers the transmission of a command configured to modify the at least one third party interaction that was identified as a duplicate third party interaction.

The process 300 then moves to block 314 of FIG. 3 where the system 160 modifies the at least one third party interaction that was identified as a duplicate interaction. In some embodiments, modifying the at least one third party interaction comprises automatically cancelling a third party interaction after the system 160 identifies the third party interaction as a duplicate interaction. In some embodiments of the invention, the system 160 cancels the duplicate third party interaction by interrupting one or more payments from the user accounts for the duplicate third party interaction. In this embodiment, the duplicate third party interaction may be canceled without requiring input from the user and/or requiring user account information associated with the duplicate third party account. In other embodiments, modifying the at least one third party interaction comprises upgrading or downgrading the interaction by altering the subscription terms to a new subscription plan, wherein altering the subscription terms comprises altering the recurring payment amount for a subscription, altering the services and/or products offered through the subscription, and/or altering the subscription provider. For example, the user 110 may wish to downgrade to a less costly subscription and receive fewer available products and/or service in order to save money. In another example, the user 110 may wish to upgrade a subscription to a more expensive plan in order to receive more products and/or services. In yet another example, the user 110 may wish to alter the subscription provider to an alternative interaction provider as the alternative provider offers an equal or comparable subscription for less cost. In some embodiments, the system 160 may transmit a notification to the user device 111 requesting user confirmation before modifying the at least one third party interaction. In other embodiments, the system may simply inform the user 110 of the duplicate interaction via a transmitted notification without modifying the duplicate interaction.

FIG. 5 provides a high level process flow for transmitting an actionable notification to the user computing device in order to modify a third party interaction, in accordance with one embodiment of the invention. The process 500 begins at block 502 where the system 160 identifies that at least one third party interaction is a duplicate third party interaction based on the information associated with the interactions as previously discussed in block 310 of FIG. 3.

Referring now back to FIG. 5, the process 500 continues in block 504 where the system 160 transmits an actionable notification to the user device 111 which presents the user 110 with the at least one third party interaction previously identified by the system 160. The notification is transmitted to the user device 111 via the client application which allows the user to interact with the actionable notification and input user instructions for modifying the at least one third party interaction identified as a duplicate third party interaction. In some embodiments, the actionable notification is an in-line alert integrated into the user's transactions and/or account status displayed in the client application or other account management interface. In some embodiments, the actionable notification provides means for the user 110 to accept or decline the modification of a third party interaction such as interactive button options displayed by the client interface. In some embodiments, the actionable notification provides means for the user 110 to accept or decline canceling a third party interaction.

In some embodiments of the invention, the subscription managements system 160 establishes operative communication channels over the network 130 to one or more third party systems 192 to extract information associated with the third party interactions associated with the user 110 and the user accounts. In some embodiments, the system 160 extracts general information from the third party systems 192 which is accessible without requiring authentication information to login and access a specific account. For example the system 160 may extract general information such as subscription plans, pricing, available offers, products and/or service offered by the third party, and the like. In other embodiments, the system 160 may prompt the user 110 to provide authentication information associated with third party interaction accounts in order to extract user-specific information associated with the user's account with the third party such as pricing and billing information, membership status, subscription signup and renewal dates, products and/or services available to the user 110 with the user's current subscription plan, offers available to the user, and the like.

In some embodiments, the system 160 identifies benefits associated with the user's specific third party interaction account from the information extracted from the third party system 192 and presents the benefits of the account to the user 110 in the actionable notification. Benefits associated with a user's third party interaction account may comprise earned reward points, funds stored on the account, a grandfathered pricing option that is no longer available to new customers, elevated membership status, and the like. For example, the system 160 may be able to identify that the user 110 has been a member of a particular subscription service for a certain amount of time and holds an elevated membership status with additional rewards or benefits due to extended customer loyalty. In another example, after identifying a duplicate third party interaction, the system 160 may additionally identify that one of the interactions, either original or duplicate, has funds loaded onto the account by the user 110. The user 110, upon being presented with this information, might be more inclined to retain the interaction with the loaded funds and cancel the other interaction as an unwanted duplicate.

In some embodiments, the system 160 may identify benefits associated with the user accounts, wherein a first user account maintained by a first financial institution may provide different benefits than a second user account maintained by a second financial institution. Benefits associated with user accounts may include reward points and the like. In some embodiments, benefits associated with the user accounts may comprise partnerships between the financial institution maintaining the account and one or more third parties, wherein the one or more third parties provide offers, discounts, rewards, and the like for products and/or services to the user 110. In some embodiments, benefits associated with the user accounts are incorporated into the decision of how to modify a third party interaction by the system 160 or the user 110. For example, upon being presented with a duplicate third party interaction, wherein the duplicate interaction is associated with a first credit card and the original interaction is associated with a second credit card, the user 110 may decide to cancel the interaction associated with the first credit card as the second credit card offers more reward points than the first credit card.

In some embodiments, the system 160 stores the information extracted from the third party systems 192 in a database allowing the system 160 to quickly and efficiently access a centralized collection of information instead of requiring that the system 160 repeatedly access the third party systems 192 to gain user-specific third party interaction account information.

In some embodiments of the invention, the subscription management system 160 extracts information from the third party systems 192 associated with one or more alternative third party interactions, wherein an alternative interaction is essentially equivalent, similar, or different to a preexisting third party interaction associated with the user 110 and the user accounts. The system 160 may present the one or more alternative third party interactions to the user 110 in the actionable notification. In some embodiments, the alternative interaction is provided by a different third party than the preexisting third party interaction. For example, the user may be a member or subscriber of a particular video-streaming service provided by a third party provider, and the system 160 may present the user subscription plans for an essentially equivalent video-streaming service by a different third party provider. In some embodiments, the alternative third party interaction has different subscription terms or plan than the preexisting third party interaction, wherein the different subscription terms comprise a different price or a different offering of products and/or services. For example, an alternative third party interaction may be presented the user 110 by the system 160 as its subscription price is lower than the price of the preexisting interaction. In some embodiments of the invention, the system 160 identifies alternative third party interactions and interaction providers for utilities such as water, electricity, natural gas, and the like. In some embodiments, the system 160 identifies alternative third party interactions and interaction providers for television subscriptions, internet subscriptions, and the like.

The process 500 next moves to block 506 of FIG. 5 where the system 160 receives the user's instructions for modifying the at least one third party interaction from the user device via the client application.

The process 500 then moves to block 508 of FIG. 5 where based on receiving the user instructions from the user device 111 via the client application, the subscriptions management system 160 triggers the transmission of a command configured to modify the at least one third party interaction identified as a duplicate third party interaction.

The process 500 then moves to block 510 where the system 160 modifies the at least one third party interaction according to the received user instructions. In some embodiments, modifying the at least one third party interaction comprises cancelling the interaction, upgrading the interaction, downgrading the interaction, and/or changing the interaction provider.

Moving now to FIG. 4 which provides a high level process flow for continuously monitoring and modifying pending interactions for an enrolled user 400, in accordance with one embodiment of the invention, the process begins in block 402 of FIG. 4, where the subscription management system 160 continuously monitors the activity of the user accounts for additional, pending third party interactions. In some embodiments, the system 160 allows for the user 110 to add and authorize an additional user account via the client application that was not previously added or authorized during user enrollment. For example, the user 110 may sign up for a new credit card and wish to input the new credit card details into the system 160 via the client application in order for the system 160 to monitor the new credit card in addition to any previously enrolled user accounts for potential duplicate third party interactions.

The process 400 continues in block 404 of FIG. 4 where the system 160 identifies a pending third party application and determines that it is a potential duplicate third party interaction based on the information associated with the third party interactions stored in the database. Details of the pending third party interaction are extracted and compared to the other third party interactions already associated with the user 110 to determine potential duplicate third party interactions as previously disclosed with respect to the high level process flow of FIG. 3.

Continuing to refer to FIG. 4, the process 400 next moves to block 406 where the system 160 places a hold on payments from the user accounts for the pending third party interaction identified as a potential duplicate interaction.

The process 400 next moves to block 408 where the system 160 transmits an actionable notification to the user device 111 via the client application. In some embodiments, the actionable notification is configured to present the pending third party interaction to the user 110, wherein the actionable notification allows for the user 110 to interact with the notification on the user device 111 via the client application to provide user instructions for modifying or taking action on the pending third party interaction. In some embodiments, the user 110 is prompted to select whether to allow or deny payment for the pending third party application. In some embodiments, the actionable notification may present to the user 110 details associated with the pending third party interactions such as a description, a subscription cost, the name of the third party provider associated with the interaction, products and/or services provided by the interaction, and/or the like. In some embodiments, the system 160 may additionally present the one or more third party interactions associated with the user 110 of which the pending third party interaction was identified as a potential duplicate along with details associated with the one or more third party interactions.

The process 400 then moves to block 410 of FIG. 4 where the system 160 receives user instructions from the user device 111 via the client application for modifying the pending third party interaction.

The process 400 then moves to block 412 of FIG. 4 where based on receiving the user instructions from the user device 111 via the client application, the subscriptions management system 160 triggers the transmission of a command configured to modify the pending third party interaction.

The process 400 then moves to block 414 where the system 160 modifies the pending third party interaction according to the received user instructions. In some embodiments, the system 160 modifies the pending third party interaction by allowing or denying the payment that was previously placed on hold to the third party provider associated with the pending interaction. In some embodiments of the invention, the system 160 may not transmit an actionable notification to the user 110 and instead automatically modify the pending third party interaction after identifying it as a duplicate third party interaction of another third party interaction already associated with the user 110. In some embodiments, the system 160 modifies the older third party interaction already associated with the user 110 instead of the pending third party interaction. In some embodiments, modifying the at least one third party interaction comprises cancelling the interaction, upgrading the interaction, downgrading the interaction, and/or changing the interaction provider.

FIG. 6 provides a high level process flow for collecting information related to a user modifying a third party interaction and providing said information to a similar second user to aid in his or her decision. Upon modifying at least one third party interaction, as illustrated in block 602 and as previously discussed, the system 160 triggers the transmission of a command configured to cause the user device 111 to prompt the user 110, via the client application, to provide a reason for modifying the at least one third party interaction as illustrated in block 604 of FIG. 6.

As illustrated in block 606 of FIG. 6, the system prompts the user 110 to provide the reason for modifying the at least one third party interaction. The system 160 may request that the user 110 input a response for modifying the third party interaction. In some embodiments, the system 160 may request a typed response. In some embodiments, the system 160 may request a rating or the like for the third party interaction, the rating reflecting the user's satisfaction with the third party interaction.

The process 600 then moves to block 608 of FIG. 6 where the system 160 receives the user's reason for modifying the at least one third party interaction. In some embodiments, reasons for modifying the at least one third party interaction may comprise user satisfaction or dissatisfaction with the interaction provider, subscription terms, products and/or services offered through the interaction, and/or the like. For example, the user's reason may be financial such as the price of the interaction being too high or another provider offering an essentially equivalent interaction for an equal, comparable, or lower price. In some embodiments, the user's reason may be that the at least third party interaction is a duplicate third party interaction.

The process 600 then moves to block 610 of FIG. 6 where the subscription managements system 160 stores the user's reason for modifying the third party interaction in the database for future reference.

The process 600 concludes at block 612 of FIG. 6 where the system 160 presents the user's reason for modifying the third party interaction to a second user. In some embodiments, the second user is in the process of deciding how to modify a third party interaction associated with the second user that is similar or essentially equivalent to the third party interaction that the user modified. For example, the second user may be deciding whether to cancel a subscription to a particular video-streaming service. In this example, the system 160 may present to the second user reasons why other users canceled the same particular video-streaming service.

In some embodiments, the system 160 additionally extracts user-identifying information from the user accounts associated with the user such as the user's location, and the like. The system 160 also may extract user identifying information from user accounts associated with the second user. In some embodiments, the system 160 compares the extracted identifying information of the user 110 to that of the second user to determine if the user and the second user share common identifying characteristics such as living in the same zip code. Based on the comparison of the user-identifying information between the user 110 and the second user, the system 160 can determine that the user 110 and the second user are similar. In some embodiments of the invention, the system 160 will provide the user's reason for modifying the third party interaction to the second user if the two users are determined to be similar. In some embodiments, the second user may request similar users' reasons for modifying a third party interaction, wherein the system 160 presents the similar users' reasons to the second user. In some embodiments of the invention, the system 160 may provide users with financial trends related to other similar users such as the saving habits and spending habits of similar users.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein. For example, a portion of one or more applications may be stored on the user device, or may be included as a portion of financial institution applications, such as an online banking application, in order to achieve embodiments of the inventions described herein.

It should be understood, that the systems and devices described in FIG. 1, or other devices not specifically described herein, may be configured to establish a communication link with each other in order to accomplish the steps of the processes described herein. The link may be an internal link within the same entity (e.g., within the same financial institution or device provider) or a link with the other systems of entities (e.g., social networking systems, third-party systems, or the like). In some embodiments, the systems may be configured for monitoring the applications and devices that the system(s) utilize as data sources. The information received from monitoring may be provided via wireless network path portions through the Internet. When the systems or devices are not monitoring a source or are not being monitoring, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data feeds from the various systems or devices, the system may be configured to provide target information to the user and/or allow the user to make changes to or control the applications and/or devices.

Moreover, it should be understood that the process flows described herein include transforming the information sent and/or received from the applications of the different systems (e.g., internally or externally) and/or the devices from one or more data formats into a data format associated with an application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| To be assigned | LEVERAGING AN ARTIFICIAL INTELLIGENCE ENGINE TO GENERATE CUSTOMER-SPECIFIC USER EXPERIENCES BASED ON REAL-TIME ANALYSIS OF CUSTOMER RESPONSES TO RECOMMENDATIONS | Concurrently herewith |
| To be assigned | REAL-TIME DYNAMIC GRAPHICAL REPRESENTATION OF RESOURCE UTILIZATION AND MANAGEMENT | Concurrently herewith |
| To be assigned | SYSTEM FOR TRANSMISSION AND USE OF AGGREGATED METRICS INDICATIVE OF FUTURE CUSTOMER CIRCUMSTANCES | Concurrently herewith |
| To be assigned | SYSTEM FOR GENERATING USER EXPERIENCE FOR IMPROVING EFFICIENCIES IN COMPUTING NETWORK FUNCTIONALITY BY | Concurrently herewith |

-continued

| U.S. patent application Ser. No. | Title | Filed On |
|---|---|---|
| To be assigned | SPECIALIZING AND MINIMIZING ICON AND ALERT USAGE SYSTEM FOR AUTOMATICALLY ESTABLISHING OPERATIVE COMMUNICATION CHANNEL WITH THIRD PARTY COMPUTING SYSTEMS FOR SUBSCRIPTION REGULATION | Concurrently herewith |

What is claimed is:

1. A system for modifying duplicate third party interactions, the system comprising:
 a memory device with computer-readable program code stored thereon;
 a communication device;
 a processing device operatively coupled to the memory device and the communication device, wherein the processing device is configured to execute the computer-readable program code to:
  transmit a client application to a user computing device associated with a user;
  receive authorization from the user computing device via the client application to access user resources associated with the user, the client application being configured to present a graphical user interface configured to receive the authorization from the user;
  based on receiving the authorization to access the user resources, extract information from the user resources, wherein the information extracted from the user resources comprises information associated with third party interactions comprising user subscriptions and memberships;
  store the information associated with the third party interactions between the user and the one or more third parties in a database;
  identify that a pending third party interaction is a potential duplicate third party interaction based on the information associated with the third party interactions stored in the database;
  based on identifying that the pending third party interaction is a potential duplicate third party interaction, interrupt a payment for the pending third party interaction, wherein interrupting the payment places a hold on the payment;
  transmit an actionable notification to the user computing device, via the client application, wherein the actionable notification presents the pending third party interaction and allows the client application to receive user instructions for modifying the pending third party interaction;
  receive from the user computing device, via the client application, the user instructions for modifying the pending third party interaction;
  modify the pending third party interaction based on the user instructions;
  prompt the user, via the client application, to provide a user reason for modifying the pending third party interaction; and
  present the user reason for modifying the pending third party interaction to another user on another user computing device, wherein the another user is deciding how to modify another third party interaction similar to the pending third party interaction.

2. The system of claim 1, wherein the pending third party interaction is canceled.

3. The system of claim 1, wherein modifying the pending third party interaction comprises at least one of allowing the payment and denying the payment.

4. The system of claim 1, wherein transmitting the actionable notification to the user computing device further comprises:
 establishing an operative communication channel with one or more third party systems;
 extracting benefits associated with the third party interactions from the one or more third party systems, wherein the benefits comprise reward points, earned credit, and membership status;
 triggering, based on identifying the benefits associated with the third party interactions, transmission of a command configured to cause the user computing device to present the benefits to the user via the client application; and
 presenting the benefits to the user via the client application.

5. The system of claim 1, wherein transmitting the actionable notification to the user computing device further comprises:
 establishing an operative communication channel with one or more third party systems;
 extracting interaction information from the one or more third party systems;
 identifying one or more alternative interactions based on the interaction information extracted from the one or more third party systems, wherein the one or more alternative interactions are provided by different third party providers than the pending third party interaction; and
 presenting the one or more alternative interactions to the user via the client application.

6. The system of claim 5, wherein the one or more alternative interactions comprise different subscription terms than the pending third party interaction associated with the user.

7. The system of claim 1, wherein the processing device is further configured to execute the computer-readable program code to:
 store the user reason in the database.

8. The system of claim 1, wherein the user is a first user and the another user is a second user, and wherein presenting the user reason to the second user further comprises:
 extracting user identifying information associated with the first user from the user resources;
 extracting user identifying information associated with the second user from second user resources associated with the second user;
 comparing the user identifying information associated with the first user with the user identifying information associated with the second user; and
 determining that the second user is similar to the first user based on comparing the user identifying information associated with the first user with the user identifying information associated with the second user.

9. A computer program product for modifying duplicate third party interactions, the computer program product comprising at least one non-transitory computer readable medium having computer-readable program code portions embodied therein, the computer-readable program code portions comprising:

an executable portion configured for transmitting a client application to a user computing device associated with a user;

an executable portion configured for receiving authorization from the user computing device via the client application to access user resources associated with the user, the client application being configured to present a graphical user interface configured to receive the authorization from the user;

an executable portion configured for, based on receiving the authorization to access the user resources, extracting information from the user resources, wherein the information extracted from the user resources comprises information associated with third party interactions comprising user subscriptions and memberships;

an executable portion configured for storing the information associated with the third party interactions between the user and the one or more third parties in a database;

an executable portion configured for identifying that a pending third party interaction is a potential duplicate third party interaction based on the information associated with the third party interactions stored in the database;

an executable portion configured for interrupting a payment for the pending third party interaction based on identifying that the pending third party interaction is a potential duplicate third party interaction, wherein interrupting the payment places a hold on the payment;

an executable portion configured for transmitting an actionable notification to the user computing device, via the client application, wherein the actionable notification presents the pending third party interaction and allows the client application to receive user instructions for modifying the pending third party interaction;

an executable portion configured for receiving from the user computing device, via the client application, the user instructions for modifying the pending third party interaction;

an executable portion configured for modifying the pending third party interaction based on the user instructions;

an executable portion configured for prompting the user, via the client application, to provide a user reason for modifying the pending third party interaction; and an executable portion configured for presenting the user reason for modifying the pending third party interaction to another user on another user computing device, wherein the another user is deciding how to modify another third party interaction similar to the pending third party interaction.

10. The computer program product of claim 9, wherein the pending third party interaction is canceled.

11. The computer program product of claim 9, wherein modifying the pending third party interaction comprises at least one of allowing the payment and denying the payment.

12. The computer program product of claim 9, wherein transmitting the actionable notification to the user computing device further comprises:
establishing an operative communication channel with one or more third party systems;
extracting benefits associated with the third party interactions from the one or more third party systems, wherein the benefits comprise reward points, earned credit, and membership status;
triggering, based on identifying the benefits associated with the third party interactions, transmission of a command configured to cause the user computing device to present the benefits to the user via the client application; and
presenting the benefits to the user via the client application.

13. The computer program product of claim 9, wherein transmitting the actionable notification to the user computing device further comprises:
establishing an operative communication channel with one or more third party systems;
extracting interaction information from the one or more third party systems;
identifying one or more alternative interactions based on the interaction information extracted from the one or more third party systems, wherein the one or more alternative interactions are provided by different third party providers than the pending third party interaction; and
presenting the one or more alternative interactions to the user via the client application.

14. The computer program product of claim 13, wherein the one or more alternative interactions comprise different subscription terms than the pending third party interaction associated with the user.

15. The computer program product of claim 9, wherein the computer-readable program code portions further comprise:
an executable portion configured for storing the user reason in the database.

16. The computer program product of claim 9, wherein the user is a first user and the another user is a second user, and wherein presenting the user reason to the second user further comprises:
extracting user identifying information associated with the first user from the user resources;
extracting user identifying information associated with the second user from second user resources associated with the second user;
comparing the user identifying information associated with the first user with user identifying information associated with the second user; and
determining that the second user is similar to the first user based on comparing the user identifying information associated with the first user with the user identifying information associated with the second user.

17. A computer-implemented method for modifying duplicate third party interactions, the method comprising:
transmitting a client application to a user computing device associated with a user;
receiving authorization from the user computing device via the client application to access user resources associated with the user, the client application being configured to present a graphical user interface configured to receive the authorization from the user;
based on receiving the authorization to access the user resources, extracting information from the user resources, wherein the information extracted from the user resources comprises information associated with third party interactions comprising user subscriptions and memberships;
storing the information associated with the third party interactions between the user and the one or more third parties in a database;
identifying that a pending third party interaction is a duplicate third party interaction based on the information associated with the third party interactions stored in the database;

based on identifying that the pending third party interaction is a potential duplicate third party interaction, interrupting a payment for the pending third party interaction, wherein interrupting the payment places a hold on the payment;

transmitting an actionable notification to the user computing device, via the client application, wherein the actionable notification presents the pending third party interaction and allows the client application to receive user instructions for modifying the pending third party interaction;

receiving from the user computing device, via the client application, the user instructions for modifying the pending third party interaction;

modifying the pending third party interaction based on the user instructions;

prompting the user, via the client application, to provide a user reason for modifying the pending third party interaction; and presenting the user reason for modifying the pending third party interaction to another user on another user computing device, wherein the another user is deciding how to modify another third party interaction similar to the pending third party interaction.

18. The computer-implemented method of claim 17, wherein the pending third party interaction is canceled.

19. The computer-implemented method of claim 17, wherein modifying the pending third party interaction comprises at least one of allowing the payment and denying the payment.

20. The computer-implemented method of claim 17, wherein the user is a first user and the another user is a second user, and wherein presenting the user reason to the second user further comprises:

extracting user identifying information associated with the first user from the user resources;

extracting user identifying information associated with the second user from second user resources associated with the second user;

comparing the user identifying information associated with the first user with the user identifying information associated with the second user; and determining that the second user is similar to the first user based on comparing the user identifying information associated with the first user with the user identifying information associated with the second user.

* * * * *